(12) United States Patent
Nam (10) Patent No.: US 12,275,455 B2
(45) Date of Patent: Apr. 15, 2025

(54) MEMBER JOINT DEVICE FOR VEHICLE

(71) Applicants: Hyundai Motor Company, Seoul (KR); Kia Corporation, Seoul (KR)

(72) Inventor: Jang Hyeon Nam, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 289 days.

(21) Appl. No.: 17/943,609

(22) Filed: Sep. 13, 2022

(65) Prior Publication Data

US 2023/0097065 A1 Mar. 30, 2023

(30) Foreign Application Priority Data

Sep. 23, 2021 (KR) .......... 10-2021-0125497

(51) Int. Cl.
*B62D 21/02* (2006.01)
*B62D 21/17* (2006.01)
*B62D 25/20* (2006.01)
*B62D 27/02* (2006.01)

(52) U.S. Cl.
CPC ............ *B62D 21/17* (2013.01); *B62D 21/02* (2013.01); *B62D 27/023* (2013.01); *B62D 25/2054* (2013.01)

(58) Field of Classification Search
CPC ........ B62D 21/06; B62D 21/08; B62D 21/17; B62D 21/18; B62D 21/20; B62D 25/20; B62D 25/2054; B62D 27/02; Y10T 403/345; Y10T 403/349
See application file for complete search history.

(56) References Cited

U.S. PATENT DOCUMENTS

| 4,570,967 | A  | * | 2/1986  | Allnutt ............... B62D 53/067 280/789 |
| 7,644,978 | B2 | * | 1/2010  | Tosaka ............... B60N 2/005 296/193.07 |
| 7,716,835 | B2 | * | 5/2010  | Johnson ............. B64C 3/182 29/897 |
| 11,177,526 | B2 | * | 11/2021 | Günther ............. B60K 1/04 |
| 2005/0189791 | A1 | * | 9/2005  | Chernoff ........... B62D 25/2036 296/193.07 |
| 2008/0075540 | A1 | * | 3/2008  | Kim ................... E02D 17/202 405/276 |
| 2009/0102238 | A1 | * | 4/2009  | Gomi ................. B62D 25/20 296/193.07 |
| 2009/0108633 | A1 | * | 4/2009  | Ohi .................... B62D 25/2036 296/204 |
| 2010/0244497 | A1 | * | 9/2010  | Honda ............... B62D 23/005 296/205 |
| 2015/0298739 | A1 | * | 10/2015 | Buschjohann ..... B62D 21/02 296/193.08 |
| 2016/0207572 | A1 | * | 7/2016  | Natsume ............ B62D 25/20 |

(Continued)

Primary Examiner — Gregory A Blankenship
(74) Attorney, Agent, or Firm — Morgan, Lewis & Bockius LLP (57) ABSTRACT

A member joint device for a vehicle includes a pair of cross members arranged laterally; two pairs of rail members, each pair being arranged longitudinally; and a member joint crosswise-connecting the cross members and the rail members and for running and carrying wires and pipes, enhancing rigidity therebetween, and convenience to easily install electric component wires and chassis component pipes in desired route directions.

10 Claims, 5 Drawing Sheets

(56) References Cited

U.S. PATENT DOCUMENTS

| | | | |
|---|---|---|---|
| 2017/0050677 A1* | 2/2017 | Czinger | B62D 29/048 |
| 2019/0300075 A1* | 10/2019 | Wiberg | B62D 29/008 |
| 2021/0237806 A1* | 8/2021 | Kawase | B62D 25/2036 |
| 2021/0387550 A1* | 12/2021 | Lee | B60N 2/012 |
| 2023/0026362 A1* | 1/2023 | Kim | B62D 21/07 |
| 2023/0097065 A1* | 3/2023 | Nam | B62D 21/02 |
| | | | 296/204 |

\* cited by examiner

MEMBER JOINT DEVICE FOR VEHICLE

CROSS-REFERENCE TO RELATED APPLICATION

This application claims under 35 U.S.C. § 119(a) the benefit of priority to Korean Patent Application No. 10-2021-0125497 filed on Sep. 23, 2021, the entire contents of which are incorporated herein by reference.

BACKGROUND OF THE PRESENT DISCLOSURE

Field of the Present Disclosure

The present disclosure relates to a member joint device for a vehicle, and more specifically, to a member joint device for a vehicle, which can easily install various wires, pipes, etc. while joining members forming a vehicle underbody frame to each other.

Description of Related Art

Underbody frames for buses are manufactured in a complex structure in which cross members arranged laterally and rail members arranged in front and rear direction are bonded in a lattice arrangement in consideration of rigidity.

Furthermore, wires for electric components and pipes for chassis components are installed in a complex route on the underbody frame including the cross members and the rail members.

Figure 1:
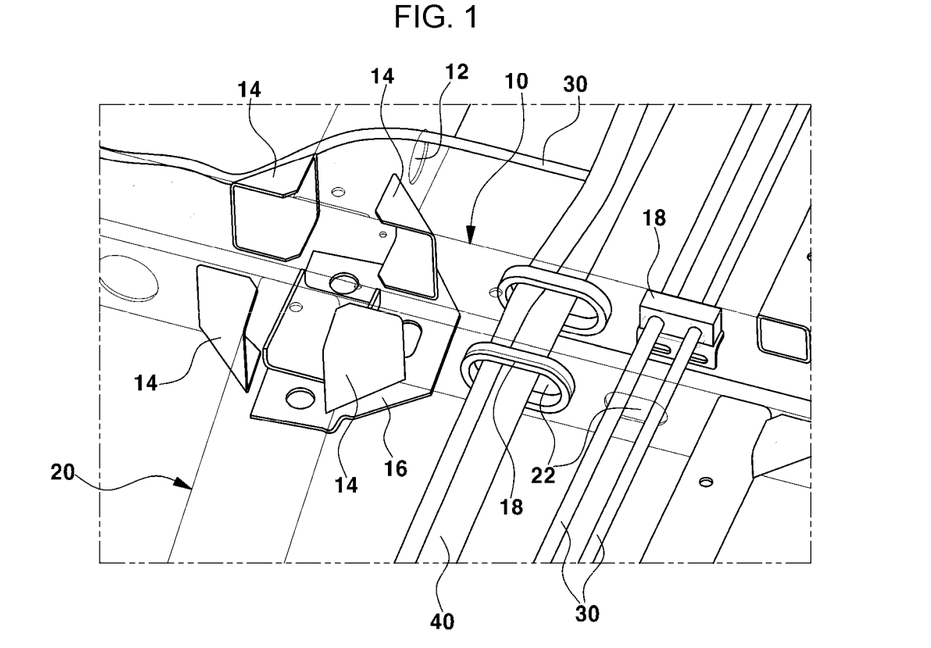
FIG. 1 is a schematic diagram showing a conventional assembling structure between a cross member and a rail member.

Referring to FIG. 1, when a wire 30 and a pipe 40 cannot be directly fastened to the side or upper and lower surfaces of a cross member 10 or a rail member 20 depending on the thickness and specification thereof, installation holes 12, 22 for passing and supporting the wire 30 and the pipe 40 are separately processed in the cross member 10 and the rail member 20.

However, there is a problem in that as the installation holes 12, 22 are formed in the cross member 10 and the rail member 20, the strengths of the cross member 10 and the rail member 20 may be reduced, and the wire 30 and the pipe 40 are in frictional contact with internal surfaces of the installation holes 12, 22 due to the traveling vibration of a vehicle, etc., thereby damaging the wire 30 and the pipe 40.

To solve the present problem, as shown in FIG. 1, a separate edge reinforcement 14 and a lower reinforcement plate 16 are further welded at a crossing point where the cross member 10 and the rail member 20 are welded to each other, preventing a reduction in the strengths of the cross member 10 and the rail member 20.

Furthermore, a separate grommet 18 configured to protect the wire 30 and the pipe 40 is further mounted in the installation holes 12, 22, preventing damage to the wire 30 and the pipe 40.

However, there are problems in that the components such as the grommet 18, the edge reinforcement 14 and the lower reinforcement plate 16 are further required, complicating an assembly structure between the cross member 10 and the rail member 20 and inevitably increasing the cost due to an increase in the number of components, and the wire 30 and the pipe 40 should be inserted one by one into the installation holes 12, 22, thereby largely reducing the workability for mounting the wire 30 and the pipe 40.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a member joint apparatus for a vehicle, which can join a cross member and a rail member forming a vehicle body underbody frame while enhancing rigidity between them, and easily install electric component wires and chassis component pipes in a desired route direction.

To achieve the object, the present disclosure provides a member joint apparatus for a vehicle including a cross member arranged laterally; a rail member arranged in the front and rear direction thereof; and a member joint including a structure of connecting the cross member and the rail member to cross each other and a structure of passing and mounting a wire and a pipe.

The member joint includes a first body portion and a second body portion including a first fastening bar inserted into and fastened to the cross member formed on external surfaces thereof, and a second fastening bar and a third fastening bar inserted into and fastened to the rail member provided on front and rear surfaces thereof, and laterally spaced from each other and a connecting plate integrally connected between upper surfaces of the first body portion and the second body portion while forming the same plane as upper surfaces of the cross member and the rail member.

A space in which the first body portion and the second body portion are disposed to be laterally spaced from each other is a space which is opened in the front and rear direction while a lower portion thereof is opened, and is formed as an installation space in which the wire and the pipe are inserted and provided.

Furthermore, assembling plates facing each other are further formed on lower end portions inside the first body portion and the second body portion.

Furthermore, a finishing plate configured to finish the opened lower portion of the installation space is detachably mounted on the assembling plate.

The first fastening bar, the second fastening bar, and the third fastening bar are formed in a hollow hole structure for reducing their weights.

A through hole is further formed in the connecting plate for reducing the weight.

Furthermore, a mounting hole configured to insert and fix the wire and the pipe whose directions are laterally changed is formed to penetrate the rail member.

An entire circumferential portion of a rear end portion of the first fastening bar and the cross member are welded to each other while the first fastening bar is inserted into the cross member, and entire circumferential portions of rear end portions of the second fastening bar and the third fastening bar and the rail member are welded to each other while the second fastening bar and the third fastening bar are inserted into the rail member.

At least one of the cross member and the rail member is further formed with a welding hole for reinforcing welding with each fastening bar.

Through the above configuration, the present disclosure provides the following effects.

First, it is possible to join the cross member and the rail member forming the vehicle body underbody frame by welding using the member joint, enhancing the rigidity for the portion where the cross member and the rail member forming the underbody frame are jointed.

Second, it is possible to easily insert and install the electric component wires and the chassis component pipes into the member joints in the desired route directions.

Third, it is possible to easily conduct the maintenance and replacement work for the electric component wire and the chassis component pipe by separating the finishing plate mounted on the lower opening portion of the member joint.

Fourth, it is possible to provide the underbody frame on which the battery may be easily mounted on the electric vehicle by flattening the cross member and the rail member connected to each other by the member joint.

It is understood that the term "automotive" or "vehicular" or other similar term as used herein is inclusive of motor automotive in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels determined from resources other than petroleum). As referred to herein, a hybrid automotive is an automotive that has two or more sources of power, for example both gasoline-powered and electric-powered automotives.

The above and other features of the present disclosure are discussed infra.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

The above and other features of the present disclosure will now be described in detail with reference to certain exemplary examples thereof illustrated in of illustration only, and thus are not limitative of the present disclosure, and wherein.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, an exemplary embodiment of the present disclosure will be described in detail with reference to the accompanying drawings.

Figure 2:
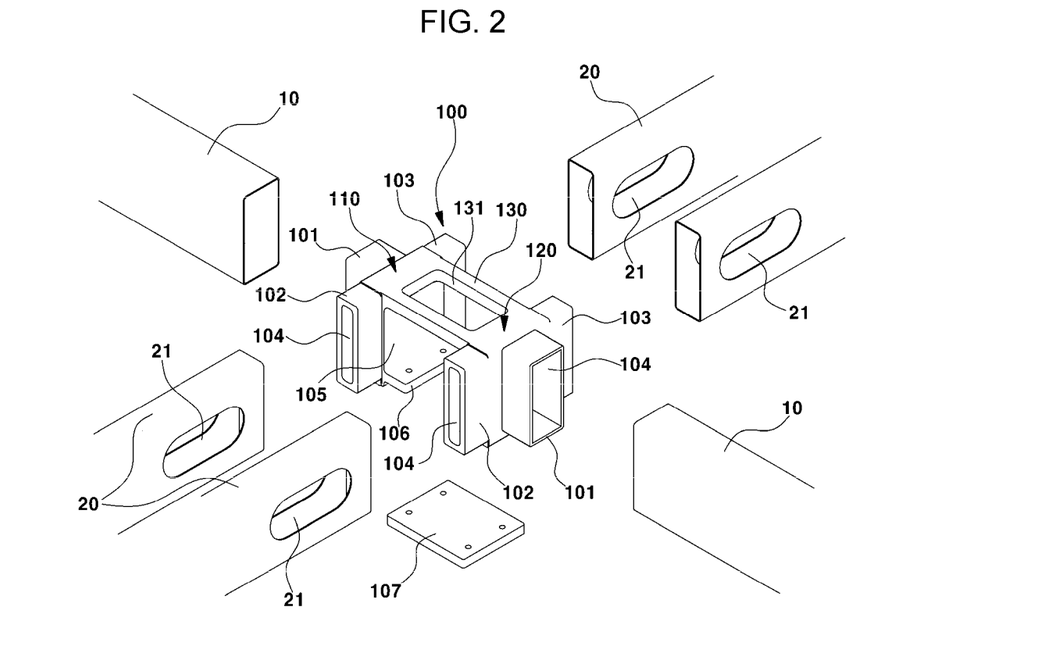
FIG. 2 is an exploded perspective diagram showing a member joint device configured for a vehicle according to an exemplary embodiment of the present disclosure.
Figure 3:
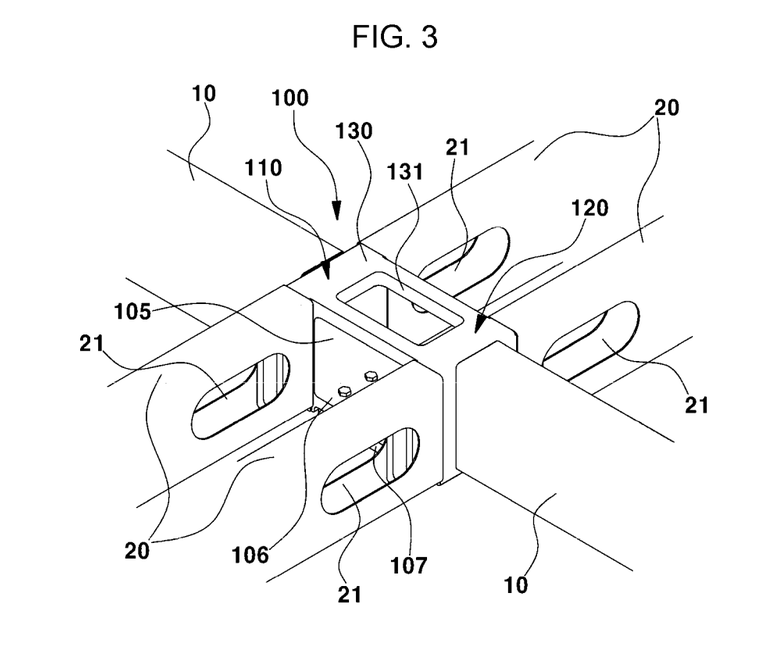
FIG. 3 is an assembling perspective diagram showing the member joint device configured for the vehicle according to an exemplary embodiment of the present disclosure.

FIG. 2 and FIG. 3 show states before and after a member joint device for a vehicle according to an exemplary embodiment of the present disclosure is assembled, respectively.

As shown in FIG. 2 and FIG. 3, an underbody frame of a vehicle (particularly, a bus) includes a plurality of cross members 10 arranged laterally and a plurality of rail members 20 arranged in front and rear direction, and the cross member 10 and the rail member 20 are manufactured in a hollow structure for reducing their weights.

A member joint 100 is disposed at a crossing point therebetween so that the cross member 10 and the rail member 20 forming the underbody frame are arranged in a lattice shape on the same plane.

According to an exemplary embodiment of the present disclosure, the member joint 100 is provided in a structure of connecting the cross member 10 and the rail member 20 to cross each other and in a structure of passing and mounting a wire and a pipe.

To the present end, the member joint 100 may include a first body portion 110 and a second body portion 120 with the same shape that are laterally spaced from each other, and a connecting plate 130 integrally connecting upper surfaces of the first body portion 110 and the second body portion 120.

The first body portion 110 is provided in a structure in which a first fastening bar 101 inserted into and fastened to one of two cross members to be jointed on an external surface of one side thereof is formed to protrude, and a second fastening bar 102 and a third fastening bar 103 inserted into and fastened to two rail members 20 to be jointed on front and rear surfaces thereof, respectively are formed to protrude.

Likewise, the second body portion 120 is provided in a structure in which the first fastening bar 101 inserted into and fastened to the other one of the two cross members to be jointed on an external surface of the other side thereof is formed to protrude, and the second fastening bar 102 and the third fastening bar 103 inserted into and fastened to the two rail members 20 to be jointed on the front and rear surfaces thereof, respectively are formed to protrude.

The first fastening bar 101, the second fastening bar 102, and the third fastening bar 103 are manufactured in a structure in which a hollow hole 104 is formed therein for reducing their weights.

The connecting plate 130 integrally connecting the upper surfaces of the first body portion 110 and the second body portion 120 is also manufactured in a structure in which a through hole 131 with a predetermined size is formed to reduce the weight.

At the present time, welding is made between an entire circumferential portion of a rear end portion of the first fastening bar 101 and the cross member 10 that are in line contact with each other while the first fastening bar 101 is inserted into the cross member 10, and welding is performed between the entire circumferential portions of rear end portions of the second fastening bar 102 and the third fastening bar 103 and the rail member 20 that are in line contact with each other while the second fastening bar 102 and the third fastening bar 103 are inserted into the rail member 20, and therefore, two or more cross members 10 and rail members 20 are in a state of crossing each other and being jointed.

Meanwhile, the cross member 10 or the rail member 20 may be further formed with a welding hole 19 for performing reinforcing welding to improve a bonding strength with the respective fastening bars 101, 102, 103.

Figure 4:
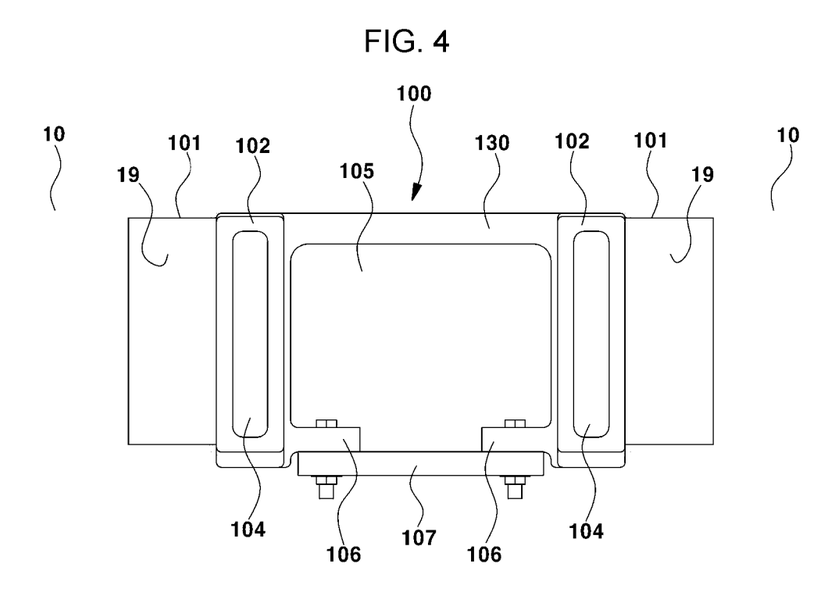
FIG. 4 is a cross-sectional diagram showing the member joint device for the vehicle according to an exemplary embodiment of the present disclosure.

In other words, as shown in FIG. 4, by further forming the welding hole 19 in the cross member 10, the reinforcing welding is performed between the first fastening bar 101 inserted into the cross member 10 and an internal circumferential surface of the welding hole 19, and by further forming the welding hole in the rail member 20 as well, the reinforcing welding may be further performed between the second fastening bar 102 and the third fastening bar 103 inserted into the rail member 20 and the internal circumferential surface of the welding hole.

As described above, it is possible to join the cross member 10 and the rail member 20 with the member joint 100 interposed therebetween by welding, enhancing rigidity for the portion where the cross member 10 and the rail member 20 forming the underbody frame are jointed.

Furthermore, when the cross member 10 and the rail member 20 are interconnected by the member joint 100 as described above, it is possible to provide the flattened underbody frame in which a battery for an electric vehicle is easily mounted by implementing the flattening in which upper surfaces of the first body portion 110 and the second body portion 120 forming the member joint 100 and an upper surface of the connecting plate 130 are formed on the same plane as the upper surfaces of the cross member 10 and the rail member 20.

According to an exemplary embodiment of the present disclosure, in addition to the joint function between the cross member 10 and the rail member 20, the member joint 100 can have various electric component wires and chassis component pipes for the vehicle stably inserted and provided in desired route directions.

To the present end, a space in which the first body portion 110 and the second body portion 120 of the member joint 100 are laterally spaced from each other is a space which is opened in the front and rear direction while a lower portion thereof is opened, and formed as an installation space 105 in which the wire 30 and the pipe 40 are inserted and provided.

At the present time, assembly plates 106 facing each other are formed to protrude from lower end portions inside the first body portion 110 and the second body portion 120, respectively.

At the present time, a finishing plate 107 configured to finish an opened lower portion of the installation space 105, that is, an opened portion between the assembling plates 106 is detachably mounted on the assembling plate 106 via a bolt, etc.

Here, a method for inserting and installing the wire 30 and the pipe 40 into the member joint 100 will be referred to as follows.

Figure 5A:
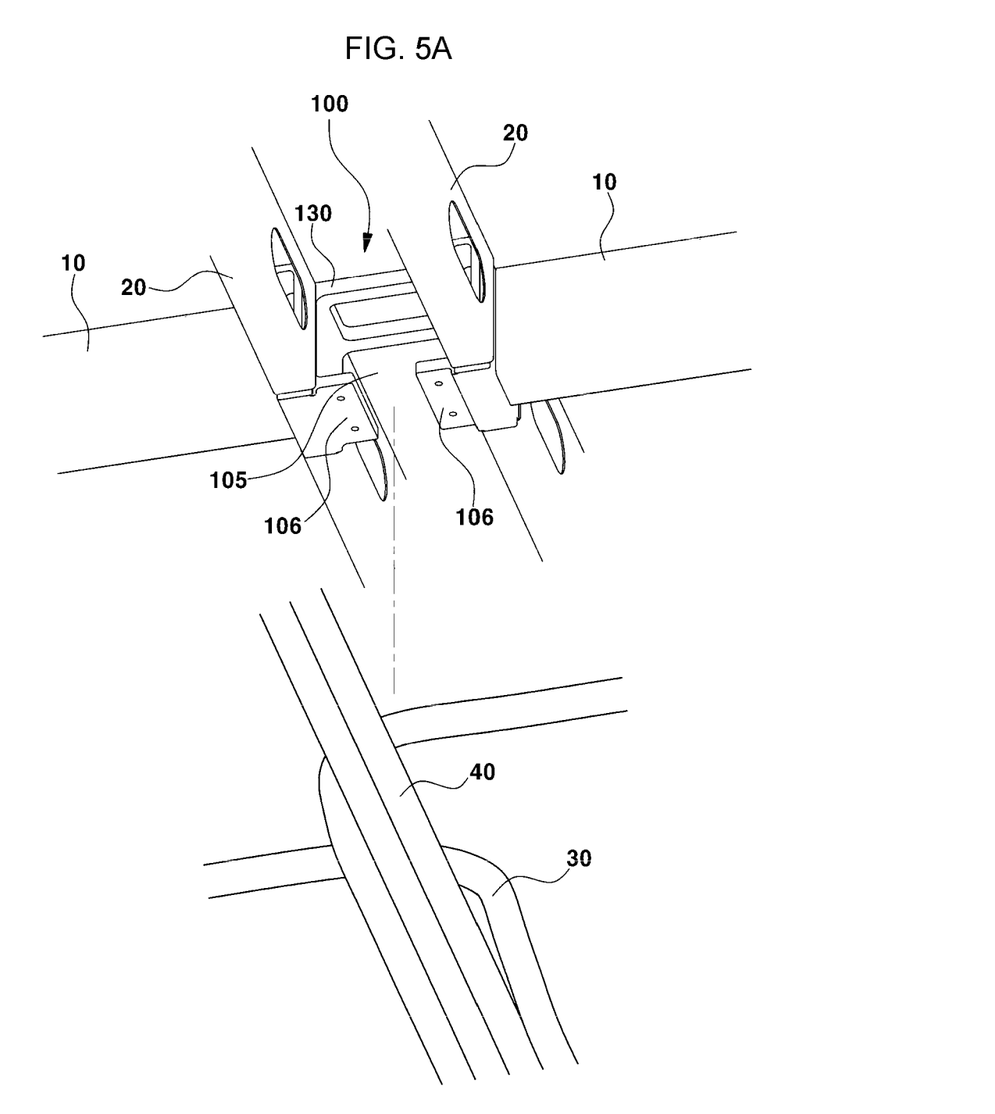
FIG. 5A, FIG. 5B, and FIG. 5C are perspective diagrams showing a process in which a wire and a pipe are inserted into and provided on the member joint device for the vehicle according to an exemplary embodiment of the present disclosure.
Figure 5B:
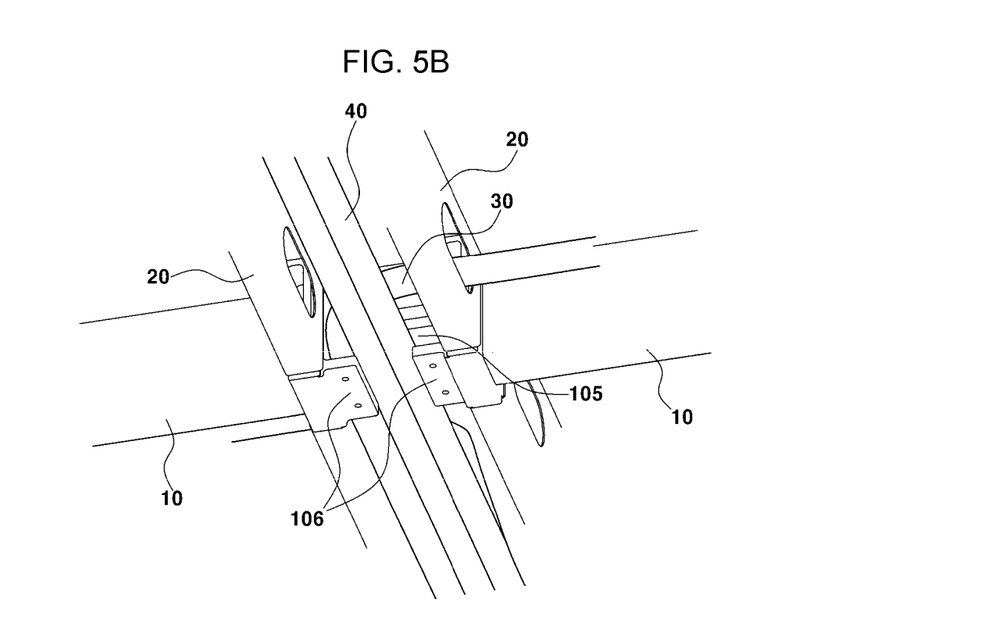
Figure 5C:
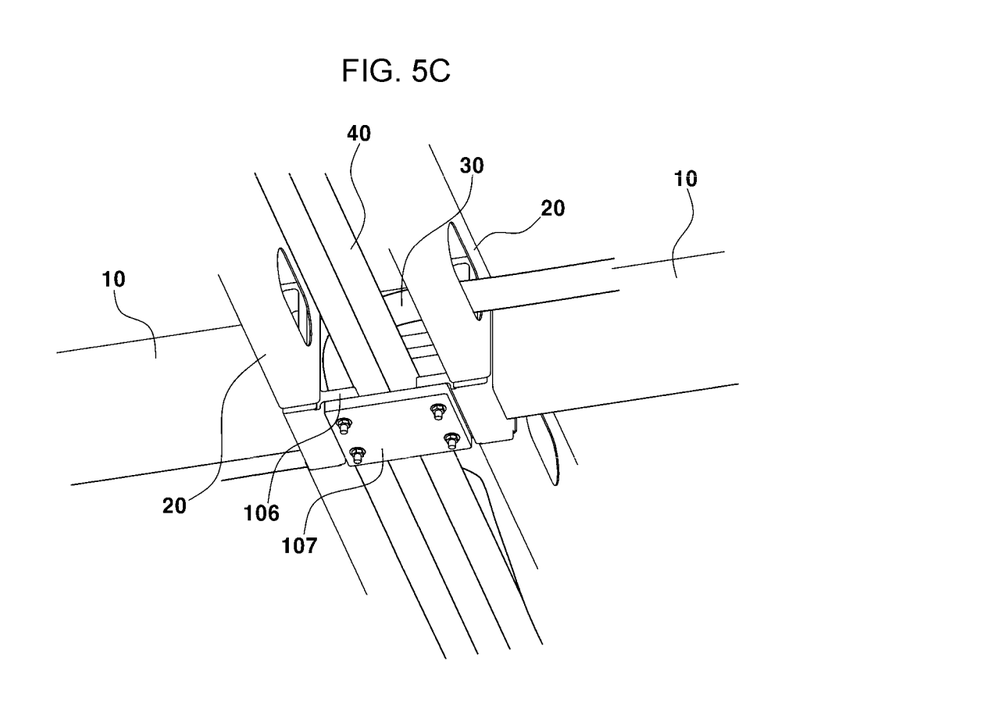
Figure 6:
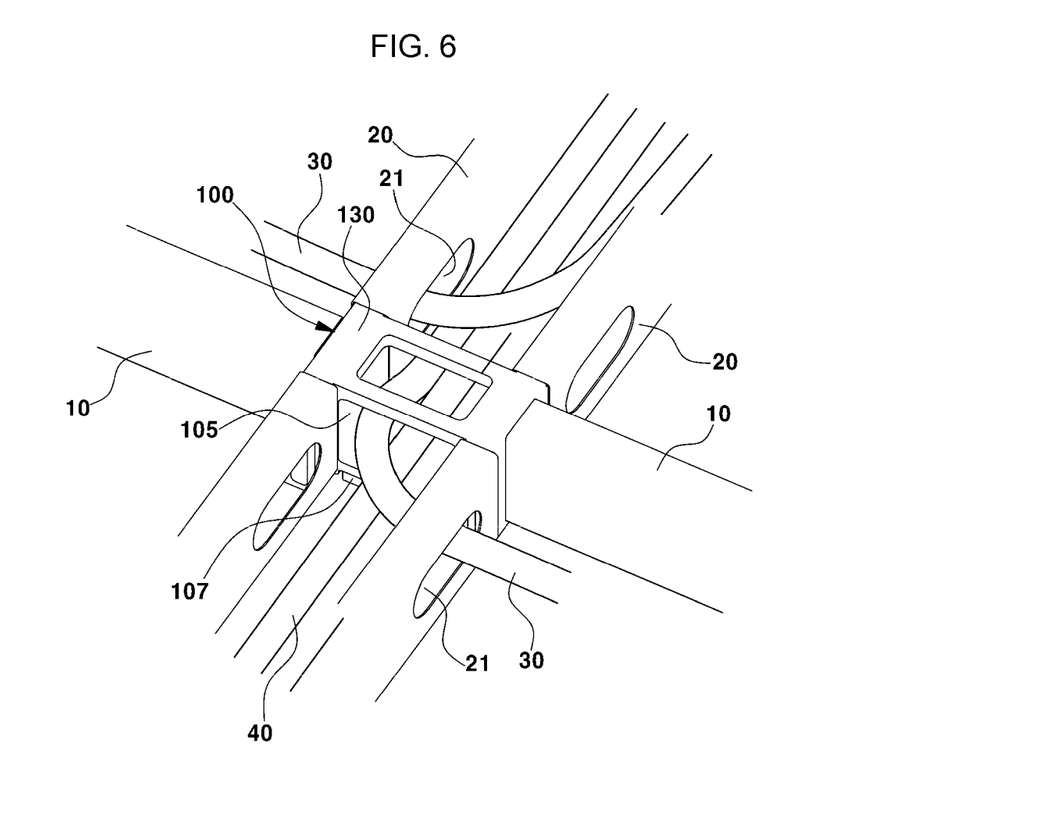
FIG. 6 is a perspective diagram showing a state where the wire and the pipe are inserted and provided on the member joint device for the vehicle according to an exemplary embodiment of the present disclosure.

FIG. 5A, FIG. 5B, and FIG. 5C are perspective diagrams showing a process in which a wire and a pipe are inserted into and provided on the member joint device for the vehicle according to an exemplary embodiment of the present disclosure, and FIG. 6 is a perspective diagram showing a state where the wire and the pipe are inserted into and provided on the member joint device for the vehicle according to an exemplary embodiment of the present disclosure.

First, as shown in FIG. 5A and FIG. 5B, various electric component wires 30 and chassis component pipes 40 for the vehicle are inserted into the installation space 105 through the opened lower portion of the installation space 105 of the member joint 100, that is, the opened portion between the assembling plates 106.

Therefore, the wire 30 and the pipe 40 are in a state of being arranged in the front and rear direction of the vehicle.

Subsequently, as shown in FIG. 5C, by detachably fastening the finishing plate 107 to the assembly plate 106 via the bolt, etc., the wire 30 and the pipe 40 inserted into the installation space 105 of the member joint 100 are in a state of being stably supported without being sagged downward.

At the present time, when maintenance and replacement work is required for the wire 30 and the pipe 40 in the installation space 105, it is possible to easily carry out the replacement work of the wire 30 and the pipe 40, etc. when the lower portion of the installation space 105 is opened by separating the finishing plate 107.

Meanwhile, a mounting hole 21 configured to insert and fix the wire 30 and the pipe 40 whose direction is changed laterally is formed to penetrate the rail member 20.

Therefore, when it is necessary to laterally change the directions of the wire 30 or pipe 40 inserted into the installation space 105 of the member joint 100 and arrange them, as shown in FIG. 6, it is possible to stably mount and fix the wire 30 and the pipe 40 that are laterally changed in the directions and arranged by passing the wire 30 and the pipe 40 whose directions are laterally changed through the mounting hole 21 of the rail member 20.

As described above, it is possible to easily insert and stably support the electric component wires 30 and the chassis component pipes 40 in the desired route directions through the installation space 105 of the member joint 100 and the mounting hole 21 of the rail member 20.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A member joint apparatus for a vehicle, the member joint apparatus comprising:
   a pair of cross members arranged laterally;
   two pairs of rail members, each pair being arranged longitudinally; and
   a member joint crosswise-connecting the cross members and the rail members for running and carrying wires and pipes,
   wherein each of the rail members has a mounting hole, penetrating thereinto, for inserting and fixing the wires and the pipes while turning directions of the wires and the pipes to predetermined directions, and
   wherein the member joint includes:
      a first body portion and a second body portion, laterally spaced from each other, each including:
         a first fastening bar, on a lateral side of the first body portion and the second body portion, to be inserted and fastened to a corresponding cross member among the cross members, respectively; and
         a second fastening bar and a third fastening bar, on a front side and a rear side of the first body portion and the second body portion, respectively, wherein each of the second fastening bar and the third fastening bar is inserted into and fastened to a corresponding rail member among the rail members; and
      a connecting plate integrated with upper portions of the first body portion and the second body, thereby connecting the first body portion and the second body portion.

2. The member joint apparatus of claim 1, wherein the connecting plate is flush with upper surfaces of the cross members and the rail members.

3. The member joint apparatus of claim 1,
a space, as defined by the first body portion and the second body portion being laterally spaced from each other, has openings in front and rear directions of the first body portion and the second body portion, for running and installing the wires and the pipes into the space.

4. The member joint apparatus of claim 1,
wherein assembling plates facing each other are further formed on lower end portions inside the first body portion and the second body portion.

5. The member joint apparatus of claim 4,
wherein the assembling plates protrude from the lower end portions of the first body portion and the second body portion to face each other.

6. The member joint apparatus of claim 4,
wherein a finishing plate, configured to close a lower opening of the space defined by the first body portion and the second body portion among the openings, is detachably mounted on the assembling plates.

7. The member joint apparatus of claim 1,
wherein each of the first fastening bar, the second fastening bar, and the third fastening bar include a hollow formed therein.

8. The member joint apparatus of claim 1,
wherein the connecting plate further has a through hole formed therein.

9. The member joint apparatus of claim 1,
wherein an entire circumferential portion of a rear end portion of the first fastening bar and the cross members are welded to each other while the first fastening bar is inserted into the cross members, and entire circumferential portions of rear end portions of the second fastening bar and the third fastening bar and the rail members are welded to each other while the second fastening bar and the third fastening bar are inserted into the rail members.

10. The member joint apparatus of claim 9,
wherein at least one of the cross members and the rail members is further formed with a welding hole for reinforcing welding with each fastening bar.

* * * * *